US006967440B2

(12) United States Patent
Racine et al.

(10) Patent No.: US 6,967,440 B2
(45) Date of Patent: Nov. 22, 2005

(54) PLASMA DISPLAY PANEL WITH A GREEN PHOSPHOR COMPOSED OF A MIXTURE OF ALUMINATES OF SPINEL STRUCTURE

(75) Inventors: Benoit Racine, Voiron (FR); Yvan Raverdy, Bernin (FR)

(73) Assignee: Thomson Licensing, Boulogne Cedex (FR)

( * ) Notice: Subject to any disclaimer, the term of this patent is extended or adjusted under 35 U.S.C. 154(b) by 197 days.

(21) Appl. No.: 10/687,427

(22) Filed: Oct. 16, 2003

(65) Prior Publication Data

US 2004/0080257 A1 Apr. 29, 2004

(30) Foreign Application Priority Data

Oct. 17, 2002 (FR) .................................. 02 12929

(51) Int. Cl.[7] .......................... H01J 17/49; H01J 1/62; H01J 63/04; C09K 11/68

(52) U.S. Cl. ..................... 313/582; 313/486; 313/487; 252/301.4 R

(58) Field of Search ................................ 313/486, 487, 313/582; 252/301.4 R

(56) References Cited

U.S. PATENT DOCUMENTS 4,096,088 A 6/1978 Ranby et al. ............ 252/301.4
2002/0041145 A1 * 4/2002 Yokosawa et al. .......... 313/486

OTHER PUBLICATIONS

Database Inspec, Institute of Electrical Engineers, Stevenage, GB; "A survey of a group of phosphors, based on hexagonal aluminate and gallate host lattices", Database accession No. 733287 XP002242766, Journal of the Electrochemical Society, Dec. 1974, USA, vol. 121, No. 12, pp. 1623-1627.

Patent Abstracts of Japan, vol. 005, No. 156, Oct. 6, 1981 & JP 56 086983 A. Jul. 15, 1981.

Patent Abstracts of Japan, vol. 017, No. 420, Aug. 5, 1993 & JP 05 086366 A, Apr. 6, 1993.

* cited by examiner

*Primary Examiner*—Karabi Guharay
*Assistant Examiner*—Matt Hoges
(74) *Attorney, Agent, or Firm*—Joseph S. Tripoli; Harvey D. Fried; Patricia A. Verlangieri

(57) ABSTRACT

Panel including a transparent front plate and a rear plate that leave between them discharge spaces, the walls of which are at least partly coated with a layer of a phosphor capable of emitting green, blue or red light; the green phosphor is formed from a mixture of two aluminates having a spinel structure, one A doped with manganese and the other B doped with cerium and with terbium; preferably, the blue phosphor is based on an aluminate of the same structure. The static charges of the various phosphors are homogenized and the risks of phosphor performance degradation during manufacture of the panel are limited.

6 Claims, 1 Drawing Sheet

PLASMA DISPLAY PANEL WITH A GREEN PHOSPHOR COMPOSED OF A MIXTURE OF ALUMINATES OF SPINEL STRUCTURE

1/ BACKGROUND OF THE INVENTION

The invention relates to a plasma display panel comprising a transparent front plate and a rear plate that leave between them discharge spaces that are filled with a gas capable of emitting ultraviolet radiation owing to the effect of discharges, and the walls of which spaces are at least partly coated with a layer of a phosphor composition capable of emitting green, blue or red light, owing to the excitation of the said ultraviolet radiation.

Plasma panels for displaying images generally comprise two parallel plates provided with arrays of electrodes; the intersections between the electrodes of the various arrays define, between the plates, discharge spaces filled with discharge gas; when the panel is in operation, suitable voltages are applied between the electrodes in order to obtain light-emitting plasma discharges in these spaces; to separate these discharge spaces or groups of discharge spaces, an array of barrier ribs is generally placed between these plates, the said barrier ribs being intended to separate these spaces or groups of spaces and, in general, to separate these plates; to be able to emit visible light, although the discharges generally emit in the ultraviolet, layers of phosphors are generally placed on the walls of the cells, especially on the sides of the barrier ribs.

In trichrome plasma panels, there are three types of UV-excitable phosphors that emit in the three distinct primary colours, namely red, green and blue. Each cell of the panel is provided with only one type of phosphor and the cells are grouped together in groups of three adjacent cells of different emission colours, each group forming a pixel of the panel capable of displaying an element of each image to be displayed.

As red phosphor, it is known to use a composition based on an yttrium gadolinium borate doped with trivalent europium of general formula $Eu:(YGd)BO_3$.

As green phosphor, it is known to use a composition based on manganese-doped zinc silicate of general formula $Mn:Zn_2SiO_4$.

As blue phosphor, it is known to use a composition based on a magnesium-barium aluminate doped with divalent europium of general formula $Eu:BaMgAl_{10}O_{17}$; such an aluminate is of the β-alumina type and has a spinel structure.

As illustrated in FIG. 10 of document US 2001-003410, the static charge of these various phosphors is very different:

+0.03 $\mu$C/g in the case of the gadolinium yttrium borate,

−0.15 $\mu$C/g in the case of the manganese-doped silicate,

+0.11 $\mu$C/g in the case of the magnesium-barium aluminate.

As taught by document US 2001-003410, these differences in static charge characteristics result in fluctuations in the initiation and expansion of the discharges between the cells of different colours of a plasma panel, and this either requires expensive devices for compensating for these differences or results in defects in image display by the panel.

To partly remedy this drawback, document US 2001-003410 proposes mixing the green phosphor based on zinc silicate with another green phosphor based on a terbium-activated rare-earth borate.

2/ SUMMARY OF THE INVENTION

An object of the invention is to propose a better solution to this static charge problem.

Moreover, it has been found that the emission performance of the phosphors depends on the process used to manufacture the panel, especially as regards the heat treatments undergone by this panel, in particular that needed for joining the front and rear plates together, generally at between 400° C. and 450° C.:

- if this treatment is carried out in a vacuum, it has been found that the emission performance of the zinc-silicate-based green phosphor degrades substantially, whereas the performance of the blue phosphor, based on a magnesium barium aluminate, does not degrade;
- conversely, if this treatment is carried out in an atmosphere, it has been found that the emission performance of the blue phosphor based on a magnesium barium aluminate degrades substantially, whereas the performance of the zinc-silicate-based green phosphor does not degrade.

A further object of the invention is to propose a solution as regards the green and blue phosphors that makes it possible to prevent, simultaneously for both these phosphors, the degradation in their performance during manufacture of the panels.

For this purpose, the subject of the invention is a plasma display panel comprising a transparent front plate and a rear plate that leave between them discharge spaces filled with a gas capable of emitting ultraviolet radiation owing to the effect of discharges, and the walls of which spaces are at least partly coated with a layer of a phosphor composition capable of emitting green, blue or red light, owing to the excitation of the said ultraviolet radiation, characterized in that the phosphor composition capable of emitting green colour consists of at least 80% by weight of a mixture of two aluminates that have a spinel structure of the magnetoplombite type and/or of the β-alumina type, one A in a weight proportion $\rho_A$ such that 90% is doped with manganese without is doped with terbium and the other B in a weight proportion $\rho_B=1-\rho_A$ being doped with cerium and with terbium without being doped with manganese.

The remaining at most twenty per cent of the phosphor composition capable of emitting green colour not formed from this mixture may comprise other known types of green phosphors.

Document U.S. Pat. No. 3,937,998 discloses green phosphor aluminates corresponding to those of this mixture and their use in fluorescent lamps when mixed with phosphors emitting other colours, especially red.

These two green phosphor aluminates, one doped with manganese, the other doped with cerium and with terbium, have different colour and persistence characteristics; the use in a plasma panel of a mixture of two green phosphors having different characteristics advantageously makes it possible to adjust, to the required level, the calorimetric and persistence properties of the composition capable of emitting green light, by adjusting the proportions $\rho_A$, $\rho_B$ in the mixture. Such an easy adjustment would not be possible using a single aluminate comprising together the three—manganese, cerium and terbium—dopants, as described in documents JP 56-086983, JP 03-017182 and JP 05-086366, especially because of the limits of solid solubility of these dopants in the aluminate described in those documents.

One advantage in using aluminates instead of zinc silicate for the green colour lies in the morphology of the aluminate particles, which, because of their flat crystal shape, is conducive to more dense and more homogenous coatings being deposited on the walls of the discharge spaces of the panel; this thus limits the risks of the formation of aggregates during deposition of the green phosphor on the walls of the discharge spaces, which formation would impair the luminous efficiency of the panel.

Preferably, the phosphor capable of emitting blue colour is based on a europium-doped aluminate having a spinel structure of the β-alumina type.

Thus, the phosphor composition capable of emitting green colour and the phosphor composition capable of emitting blue colour have the same static charge characteristics because they are both based on aluminates of the same type; the green cells and the blue cells of the panel thus have the same discharge initiation and expansion characteristics; particularly in the case of the conventional use of yttrium gadolinium borate as red phosphor with a static charge of +0.03 μC/g, the static charges of the various phosphors are homogenized and the characteristics of the red cells and those of the other cells are advantageously harmonized; thus, overall, the panel according to the invention offers better image quality and it is easier and less expensive to drive the panel.

Thus, in addition, the green and blue phosphors of the panel offer emission performance levels that depend in the same way on the process for manufacturing the panel; for example, a heat treatment of this panel, at between 400° C. and 450° C., does not, if it is carried out in a vacuum, in any way degrade the emission performance of the phosphors—neither that of the green phosphor composition nor that of the blue phosphor composition.

Preferably:

the aluminate A is of general formula $Mn:M1_{1-z}M2_zAl_xO_y$;

the aluminate B is of general formula $Ce,Tb:M'1_{1-z'}M'2_{z'}Al_{x'}O_{y'}$;

where M1, M'1, M2, M'2 are chosen from the group comprising Ba, Ca, Sr, Mg, Zn, Cd and the mixtures of these elements, where $9<x<13$, $9<x'<13$, $16<y<20$, $16<y'<20$, where $0 \leqq z<1$, $0 \leqq z'<1$.

Preferably:

the aluminate A is of formula $Mn:Ba_{1-z}Sr_zAl_{12}O_{19}$, where $0 \leqq z<1$;

the aluminate B is of formula $Ce,Tb:Mg\ Al_{11}O_{19}$.

The advantage in choosing specifically these two aluminates is that they have quite different properties, as regards both emission colorimetry and emission persistence; by modifying the proportions $\rho_A$ and $\rho_B$ in the green phosphor mixture according to the invention, it is then possible to obtain a broader range of green shades, from a deep green to a yellow-tinted green, and to vary the luminescent emission persistence from 7 ms to 15 ms approximately.

According to a first advantageous variant of the invention, $\rho_A$ is between 57% and 63%, that is to say about 60%; this proportion of aluminates in the mixture according to the invention offers a calorimetric advantage over zinc silicate of the prior art, as FIGS. 1 and 2 illustrate:

This thus improves the image display quality of the panel.

Figure 1:
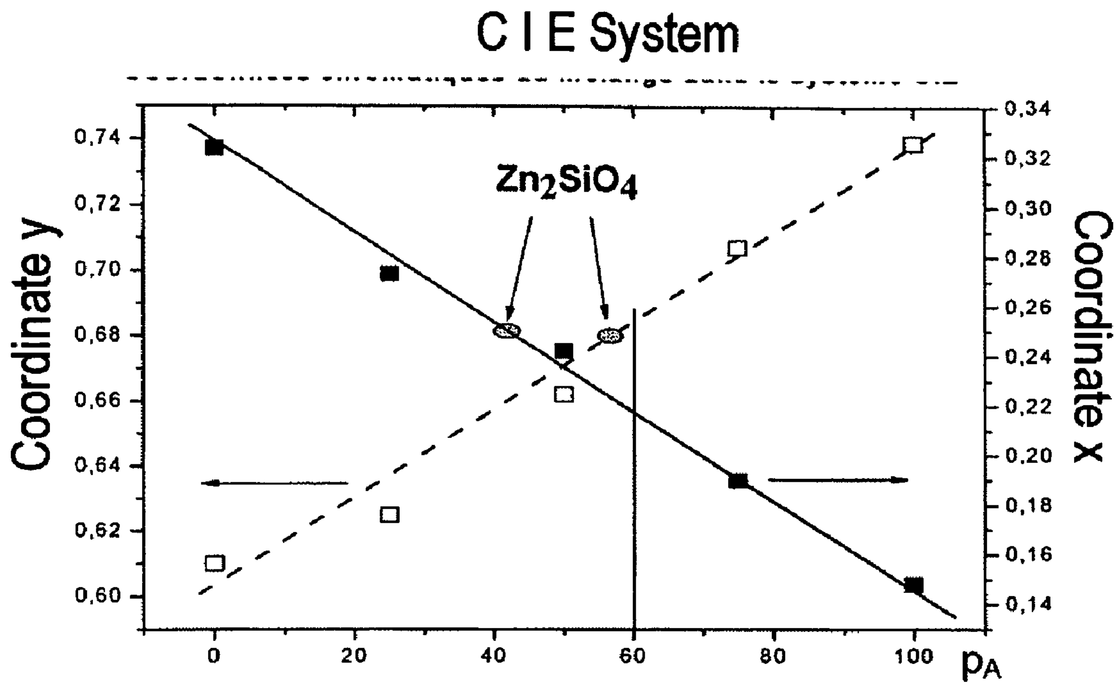
FIG. 1 shows that, for $\rho_A$=60%, the trichromatic coordinates x (solid line and black squares) and y (broken line and white squares) of the aluminate mixture according to the invention correspond to a green colour that is more saturated than that emitted by zinc silicate of the prior art.
Figure 2:
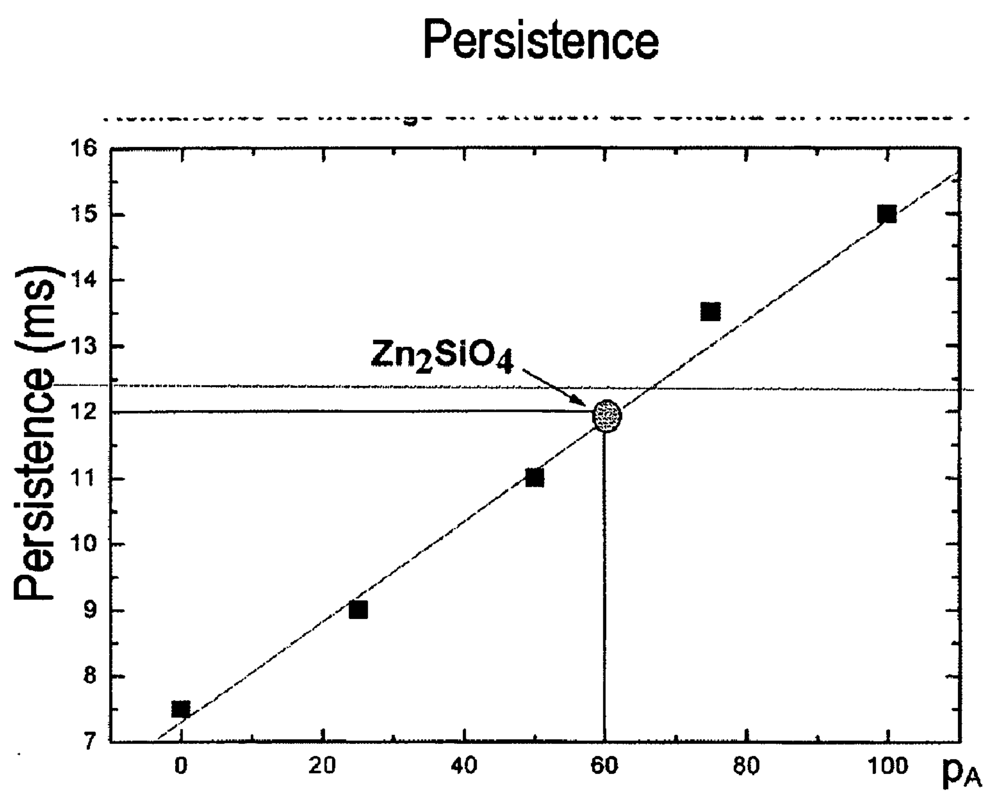
FIG. 2 shows that, for $\rho_A$=60%, the persistence of the mixture according to the invention is identical to that of zinc silicate of the prior art.

According to a second advantageous variant of the invention, $\rho_A$ is between 27% and 33%, that is to say about 30%; this proportion of aluminates in the mixture according to the invention offers a colorimetric advantage over zinc silicate of the prior art, as FIGS. 1 and 2 illustrate:

FIG. 2 shows that, for $\rho_A$=30%, the persistence of the mixture according to the invention is advantageously shorter than that of zinc silicate of the prior art;

FIG. 1 shows that, for $\rho_A$=30%, the trichromatic coordinates x (solid line and black squares) and y (broken line and white squares) of the aluminate mixture according to the invention remain quite close to those of zinc silicate of the prior art.

Thus, by virtue of the invention, it is possible to reduce the persistence of the green colour of the panel without degrading the calorimetric properties of this colour.

Preferably, the phosphor composition capable of emitting red colour is based on yttrium gadolinium borate doped with trivalent europium.

Preferably, the panel according to the invention includes at least two arrays of electrodes that intersect such that each cell is supplied via an electrode of the first array and an electrode of the second array.

Preferably, the rear plate includes an array of barrier ribs that define the cells, or groups of cells, and form cell walls that are coated with the said layer of a phosphor composition.

3/ BRIEF DESCRIPTION OF THE DRAWINGS

The invention will be more clearly understood on reading the description that follows, given by way of non-limiting example and with reference to the appended figures, in which:

FIG. 1, already described, shows the variations in the trichromatic coordinates x and y in the conventional CIE representation of the green emission from various green phosphor mixtures according to the invention, depending on the proportion $\rho_A$ of aluminate A in this mixture; the two points corresponding to the trichromatic coordinates x and y of the zinc-silicate-based green phosphor of the prior art are also shown; and FIG. 2, already described, shows the variations in the persistence of the green emission from various green phosphor mixtures according to the invention, depending on the proportion $\rho_A$ of aluminate A in this mixture; the horizontal line at 12 ms corresponds to the persistence of the zinc-silicate-based green phosphor of the prior art.

4/ DESCRIPTION OF THE PREFERRED EMBODIMENTS

The plasma panel according to the invention comprises a front plate and a rear plate that leave between them discharge spaces that are filled with a mixture of neon and xenon and are distributed in rows and columns.

The front plate includes, on its internal face, an array of coplanar electrodes, called sustain electrodes, coated with a dielectric layer and with a magnesia-based protective and secondary-electron-emitting layer.

The rear plate includes, on its internal face, an array of electrodes, called address electrodes, and an array of barrier ribs that define the cells and serve as spacers between the plates.

The arrays of electrodes are matched and the plates are joined together so that each cell of the panel is served by a single pair of sustain electrodes and an address electrode, and so that each row of cells is served by the same pair of sustain electrodes and so that each column of cells is served by a single address electrode.

The walls of the cells corresponding to the sides of the barrier ribs and to the rear plate are coated with a phosphor composition capable of emitting red, green or blue light; the cells of a single column are all provided with an identical composition emitting in the same colour; the cells of adjacent columns are provided with compositions emitting different colours; finally, the colours are arranged in the order red-green-blue.

The red phosphor composition is based on yttrium gadolinium borate doped with trivalent europium of general formula Eu:(YGd)$BO_3$.

The green phosphor composition is, according to the invention, a mixture of two aluminates that have a spinel structure of the magnetoplombite type or of the β-alumina type, one A, of formula Mn:$BaSrAl_{12}O_{19}$, in a weight proportion $\rho_A$ =30%, and the other B, of formula Ce,Tb:$MgAl_{11}O_{19}$, in a weight proportion $\rho_B$ =70%.

The blue phosphor composition is based on a magnesium barium aluminate doped with divalent europium, of the β-alumina type, of formula Eu:$BaMgAl_{10}O_{17}$.

To manufacture the plasma panel according to the invention, methods are used that are known per se and will not be described here in detail.

There are a variety of methods that can be used to produce the mixture of green phosphors according to the invention; this mixture may be produced by dry attrition milling.

Advantageously, this mixture is produced in a liquid medium during the step of preparing a screen-printing paste: in this case, the phosphors are mixed directly into the screen-printing paste when the latter is blended; this paste can then be used conventionally to coat the phosphors on the rear plate.

The present invention has been described with reference to a plasma panel of the type with coplanar electrodes; it is obvious to a person skilled in the art that the invention may apply to other types of plasma panel, with or without electrodes, without departing from the scope of the claims appended hereto.

What is claimed is:

1. Plasma display panel comprising a transparent front plate and a rear plate that leave between them discharge spaces filled with a gas capable of emitting ultraviolet radiation owing to the effect of discharges, and the walls of which spaces are at least partly coated with a layer of a phosphor composition capable of emitting green, blue or red light, owing to the excitation of the said ultraviolet radiation, characterized in that the phosphor composition capable of emitting green colour consists of at least 80% by weight of a mixture of two aluminates that have a spinel structure of the magnetoplombite type and/or of the β-alumina type, one A in a weight proportion $\rho_A$ such that 90% is doped with manganese without being doped with terbium and the other B in a weight proportion $\rho_B = 1-\rho_A$ is doped with cerium and with terbium without being doped with manganese.

2. Panel according to claim 1, characterized in that the phosphor composition capable of emitting blue colour is based on a europium-doped aluminate having a spinel structure of the β-alumina type.

3. Panel according to claim 1, characterized in that:

the aluminate A is of general formula $Mn:1_{1-z}M2_zAl_xO_y$;

the aluminate B is of general formula $Ce,Tb:M'1_{1-z'}M'2_{z'}Al_{x'}O_{y'}$;

where M1, M'1, M2, M'2 are chosen from the group comprising Ba, Ca, Sr, Mg, Zn, Cd and the mixtures of these elements, where $9<x<13$, $9<x'<13$, $16<y<20$, $16<y'<20$, where $0 \leqq z<1$, $0 \leqq z'<1$.

4. Panel according to claim 3, characterized in that:

the aluminate A is of formula $Mn:Ba_{(1-z)}Sr_zAl_{12}O_{19}$, where $0 \leqq z<1$;

the aluminate B is of formula Ce,Tb:Mg $Al_{11}O_{19}$.

5. Panel according to claim 4, characterized in that $\rho_A$ is between 57% and 63%.

6. Panel according to claim 4, characterized in that $\rho_A$ is between 27% and 33%.

* * * * *